(12) United States Patent
Yi et al.

(10) Patent No.: US 10,673,673 B2
(45) Date of Patent: Jun. 2, 2020

(54) METHOD AND APPARATUS FOR PERFORMING SYNCHRONIZATION FOR CARRIER WITHOUT SYNCHRONIZATION SIGNAL IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 11 days.

(21) Appl. No.: 15/542,765

(22) PCT Filed: Feb. 3, 2016

(86) PCT No.: PCT/KR2016/001196
§ 371 (c)(1),
(2) Date: Jul. 11, 2017

(87) PCT Pub. No.: WO2016/126108
PCT Pub. Date: Aug. 11, 2016

(65) Prior Publication Data
US 2018/0006867 A1    Jan. 4, 2018

Related U.S. Application Data

(60) Provisional application No. 62/111,114, filed on Feb. 3, 2015.

(51) Int. Cl.
*H04L 27/26* (2006.01)
*H04L 5/00* (2006.01)
*H04W 56/00* (2009.01)

(52) U.S. Cl.
CPC .......... *H04L 27/2692* (2013.01); *H04L 5/001* (2013.01); *H04L 27/2657* (2013.01); *H04W 56/0015* (2013.01)

(58) Field of Classification Search
CPC .................................................. H04L 27/2692
USPC ........................................................ 370/350
See application file for complete search history.

(56) References Cited

U.S. PATENT DOCUMENTS

2006/0274712 A1* 12/2006 Malladi .............. H04B 1/70735
370/345
2009/0310563 A1* 12/2009 Chou .................. H04L 27/0006
370/331
2011/0081939 A1* 4/2011 Damnjanovic ....... H04W 52/08
455/522

(Continued)

FOREIGN PATENT DOCUMENTS

EP          2536227 A2    12/2012
KR    10-2014-0003622 A     1/2014
WO    WO 2014/018333 A2    1/2014

*Primary Examiner* — Samina F Choudhry
(74) *Attorney, Agent, or Firm* — Birch, Stewart, Kolasch & Birch, LLP

(57) ABSTRACT

A method and apparatus for performing an uplink (UL) synchronization in a wireless communication system is provided. A user equipment (UE) configures at least one UL carrier in an UL-only spectrum, and performs UL synchronization on the at least one UL carrier. The UL synchronization on the at least one UL carrier may be performed by various methods.

2 Claims, 5 Drawing Sheets

(56) References Cited

U.S. PATENT DOCUMENTS

| | | | |
|---|---|---|---|
| 2011/0134774 A1* | 6/2011 | Pelletier | H04W 52/365 |
| | | | 370/252 |
| 2012/0287917 A1 | 11/2012 | Chin et al. | |
| 2014/0293873 A1 | 10/2014 | Tseng | |
| 2015/0181546 A1* | 6/2015 | Freda | H04W 56/0015 |
| | | | 370/336 |
| 2015/0281974 A1* | 10/2015 | Ghasemzadeh | H04W 16/14 |
| | | | 455/454 |
| 2015/0333898 A1* | 11/2015 | Ji | H04W 72/1257 |
| | | | 370/280 |

* cited by examiner

[Fig. 1]
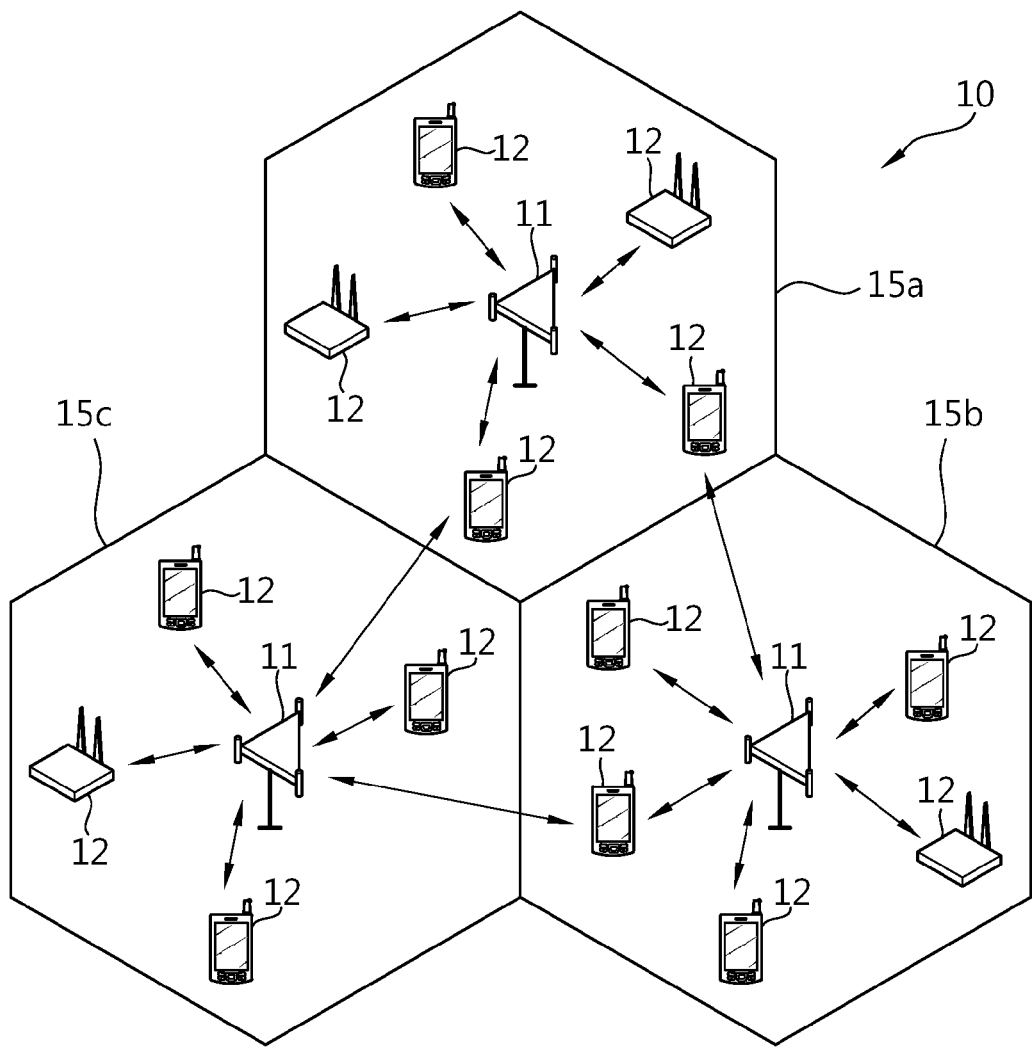
[Fig. 2]
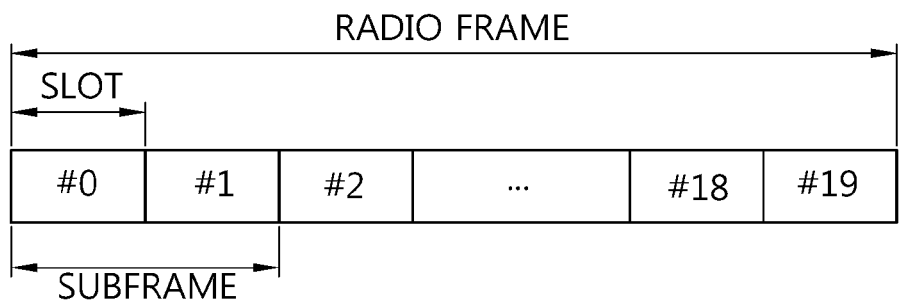

[Fig. 3]
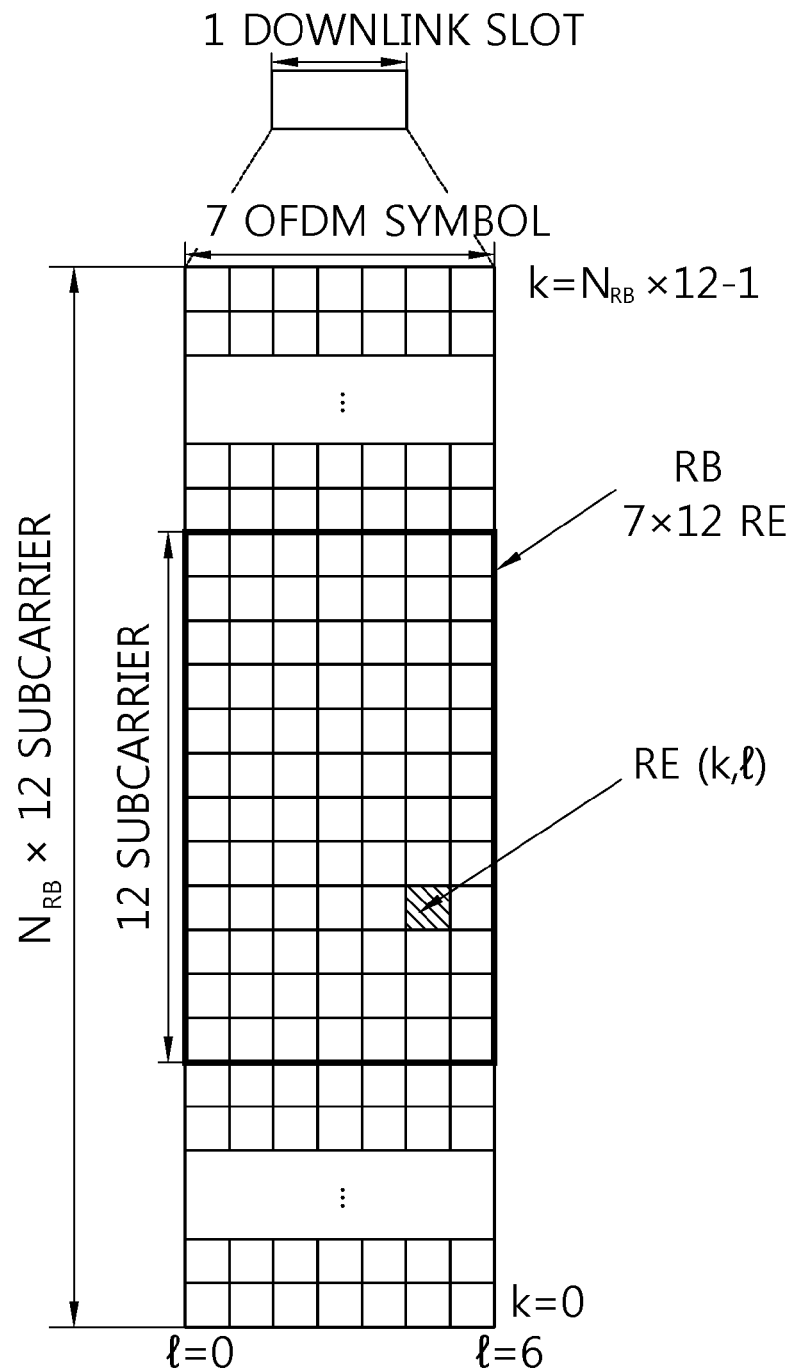

[Fig. 4]
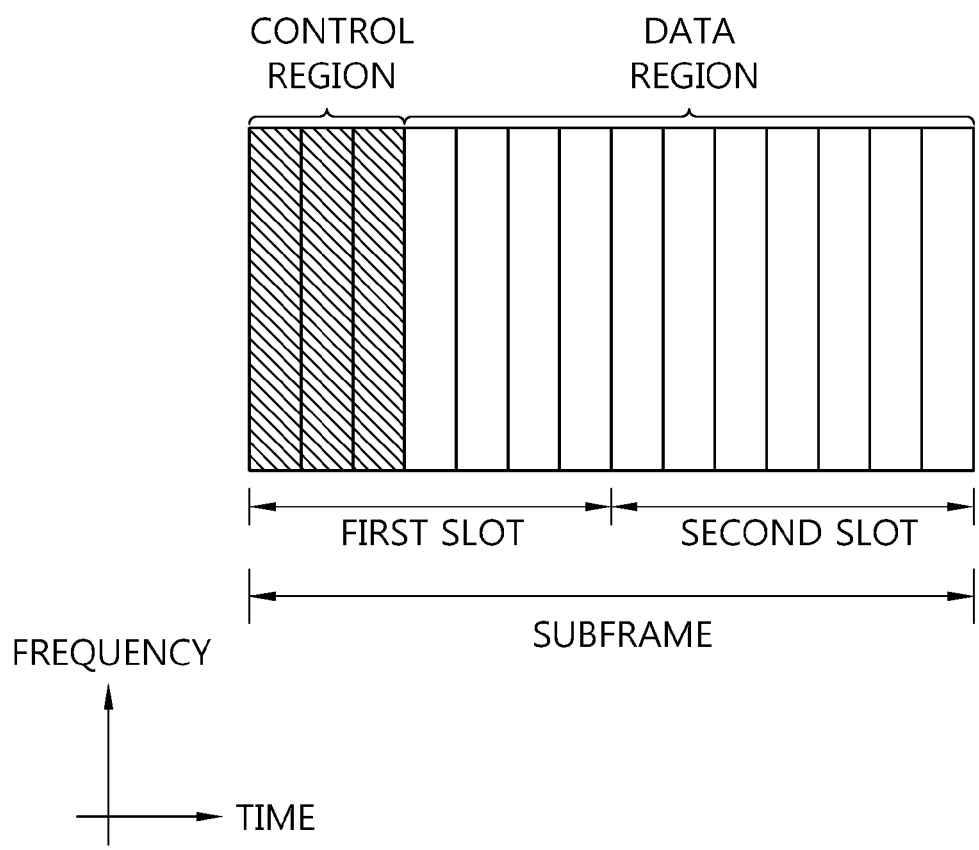

[Fig. 5]
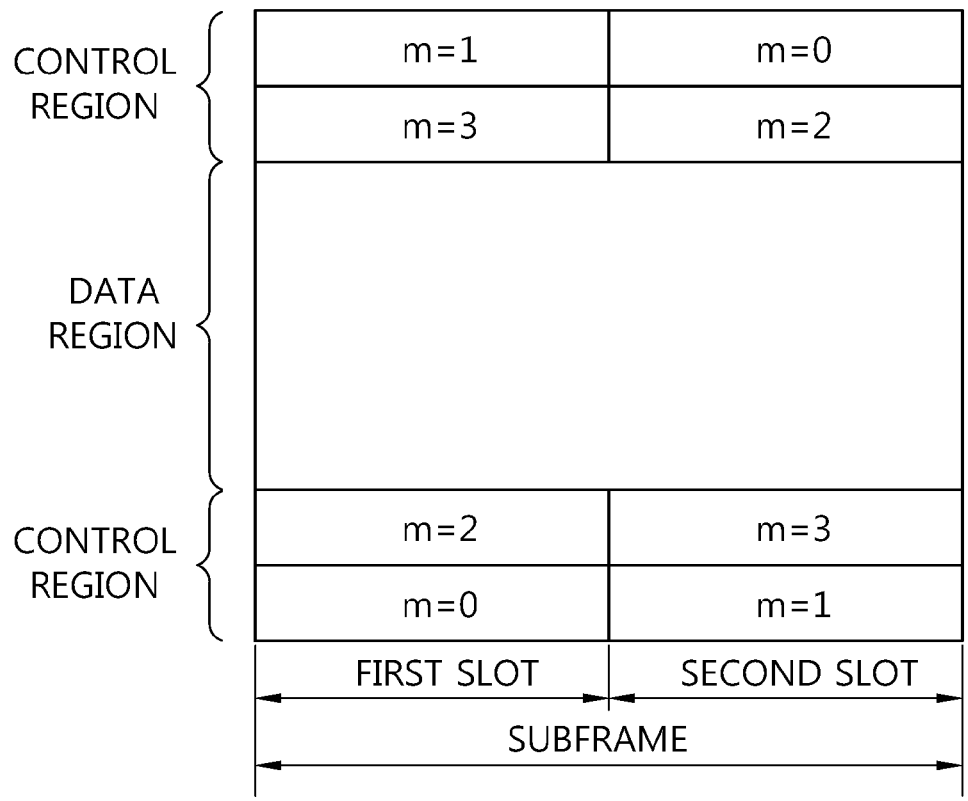
[Fig. 6]
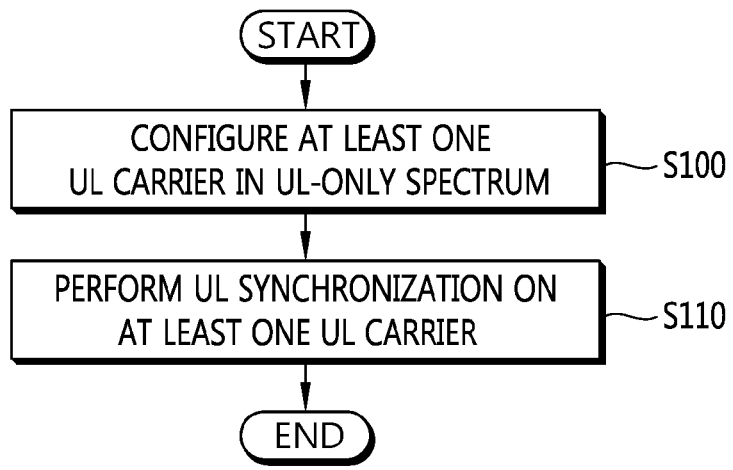

[Fig. 7]
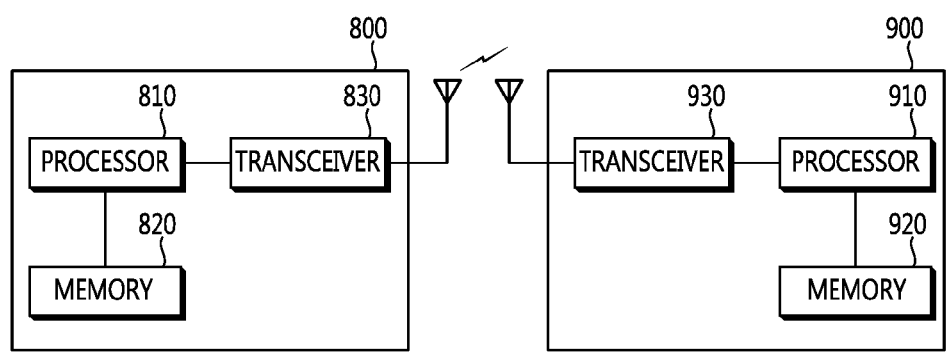

METHOD AND APPARATUS FOR PERFORMING SYNCHRONIZATION FOR CARRIER WITHOUT SYNCHRONIZATION SIGNAL IN WIRELESS COMMUNICATION SYSTEM

CROSS REFERENCE TO RELATED APPLICATIONS

This application is the National Phase of PCT/KR2016/001196 filed on Feb. 3, 2016, which claims priority under 35 U.S.C. § 119(e) to U.S. Provisional Application No. 62/111,114 filed on Feb. 3, 2015, all of which are hereby expressly incorporated by reference into the present application.

TECHNICAL FIELD

The present invention relates to wireless communications, and more particularly, to a method and apparatus for performing synchronization for a carrier without a synchronization signal in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE may configure carrier aggregation (CA). In CA, two or more component carriers (CCs) are aggregated in order to support wider transmission bandwidths up to 100 MHz. A user equipment (UE) may simultaneously receive or transmit on one or multiple CCs depending on its capabilities.

Further, as the demands on data rate keeps increasing, the utilization/exploration on new spectrum and/or higher data rate is essential. As one of a promising candidate, utilizing unlicensed spectrum, such as 5 GHz unlicensed national information infrastructure (U-NII) radio band, is being considered. As it is unlicensed, to be successful, necessary channel acquisition and completion/collision handling and avoidance are expected. As LTE is designed based on the assumption that a UE can expect DL signals from the network at any given moment (i.e., exclusive use), LTE protocol needs to be tailored to be used in non-exclusive manner. In terms of non-exclusive manner, overall two approaches may be considered. One is to allocate time in a semi-static or static manner (for example, during day time, exclusive use, and during night time, not used by LTE), and the other is to compete dynamically for acquiring the channel. The reason for the completion is to handle other radio access technology (RAT) devices/networks and also other operator's LTE devices/networks.

By introduction of utilizing unlicensed spectrum, a new type of band utilization may be feasible. Specifically, an uplink (UL)-only spectrum may be used. In this case, a method for performing UL synchronization in the UL only spectrum may be a problem.

DISCLOSURE OF INVENTION

Technical Problem

The present invention provides a method and apparatus for performing synchronization for a carrier without a synchronization signal in a wireless communication system. The present invention provides a method and apparatus for transmitting a synchronization signal. The present invention provides a method and apparatus for making references of synchronization for a carrier which may not have paired downlink spectrum or may not transmit a synchronization signal.

Solution to Problem

In an aspect, a method for performing, by a user equipment (UE), an uplink (UL) synchronization in a wireless communication system is provided. The method includes configuring at least one UL carrier in an UL-only spectrum, and performing UL synchronization on the at least one UL carrier.

In another aspect, a user equipment (UE) is provided. The UE includes a memory, a transceiver, and a processor, coupled to the memory and the transceiver, configured to configure at least one uplink (UL) carrier in an UL-only spectrum, and perform UL synchronization on the at least one one UL carrier.

Advantageous Effects of Invention

Uplink (UL) synchronization can be performed in a UL-only spectrum.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows a method for performing an UL synchronization according to an embodiment of the present invention.
FIG. 7 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Cell synchronization is the very first step when the UE wants to camp on any cell. From this, the UE acquires physical cell identifier (PCI), time slot and frame synchronization, which will enable the UE to read system information blocks from a particular network. The UE will tune it radio turn by turning to different frequency channels depending upon which bands it is supporting. Assuming that it is currently tuned to a specific band/channel, the UE first finds the primary synchronization signal (PSS) which is located in the last OFDM symbol of first time slot of the first subframe (subframe 0) of radio frame. This enables the UE to be synchronized on subframe level. The PSS is repeated in subframe 5. From PSS, the UE is also able to obtain physical layer identity (0 to 2). In the next step, the UE finds the secondary synchronization signal (SSS). SSS symbols are also located in the same subframe of PSS but in the symbol before PSS. From SSS, the UE is able to obtain physical layer cell identity group number (0 to 167).

Carrier aggregation (CA) is described. In CA, two or more component carriers (CCs) are aggregated in order to support wider transmission bandwidths up to 100 MHz. A UE may simultaneously receive or transmit on one or multiple CCs depending on its capabilities. A UE with single timing advance (TA) capability for CA can simultaneously receive and/or transmit on multiple CCs corresponding to multiple serving cells sharing the same TA (multiple serving cells grouped in one timing advance group (TAG)). A UE with multiple TA capability for CA can simultaneously receive and/or transmit on multiple CCs corresponding to multiple serving cells with different TAs (multiple serving cells grouped in multiple TAGs). E-UTRAN ensures that each TAG contains at least one serving cell. A non-CA capable UE can receive on a single CC and transmit on a single CC corresponding to one serving cell only (one serving cell in one TAG). The CA is supported for both contiguous and non-contiguous CCs with each CC limited to a maximum of 110 resource blocks in the frequency domain.

It is possible to configure a UE to aggregate a different number of CCs originating from the same eNB and of possibly different bandwidths in the UL and the DL. The number of DL CCs that can be configured depends on the DL aggregation capability of the UE. The number of UL CCs that can be configured depends on the UL aggregation capability of the UE. It is not possible to configure a UE with more UL CCs than DL CCs. In typical time division duplex (TDD) deployments, the number of CCs and the bandwidth of each CC in UL and DL is the same. The number of TAGs that can be configured depends on the TAG capability of the UE. CCs originating from the same eNB need not to provide the same coverage.

When CA is configured, the UE only has one RRC connection with the network. At RRC connection establishment/re-establishment/handover, one serving cell provides the NAS mobility information (e.g. tracking area identity (TAI)), and at RRC connection re-establishment/handover, one serving cell provides the security input. This cell is referred to as the primary cell (PCell). In the DL, the carrier corresponding to the PCell is the DL primary CC (DL PCC), while in the UL, it is the UL primary CC (UL PCC).

Depending on UE capabilities, secondary cells (SCells) can be configured to form, together with the PCell, a set of serving cells. In the DL, the carrier corresponding to a SCell is a DL secondary CC (DL SCC), while in the UL, it is an UL secondary CC (UL SCC).

Therefore, the configured set of serving cells for a UE always consists of one PCell and one or more SCells. For each SCell, the usage of UL resources by the UE in addition to the DL resources is configurable (the number of DL SCCs configured is therefore always larger than or equal to the number of UL SCCs and no SCell can be configured for usage of UL resources only). From a UE viewpoint, each UL resource only belongs to one serving cell. The number of serving cells that can be configured depends on the aggregation capability of the UE. PCell can only be changed with handover procedure (i.e. with security key change and RACH procedure). PCell is used for transmission of PUCCH. Unlike SCells, PCell cannot be de-activated. Reestablishment is triggered when PCell experiences radio link failure (RLF), not when SCells experience RLF. NAS information is taken from PCell.

In unlicensed spectrum (or, unlicensed band) where LTE devices may coexist with other radio access technology (RAT) devices such as Wi-Fi, Bluetooth, etc., it is necessary to allow a UE behavior adapting various scenarios. In LTE in unlicensed spectrum (LTE-U), various aspects for 3GPP LTE described above may not be applied for LTE-U. For example, the TTI described above may not be used for LTE-U carrier where variable or floating TTI may be used depending on the schedule and/or carrier sensing results. For another example, in LTE-U carrier, rather than utilizing a fixed DL/UL configuration, dynamic DL/UL configuration based on scheduling may be used. However, due to UE characteristics, either DL or UL transmission may occur at time. For another example, different number of subcarriers may also be utilized for LTE-U carrier.

By the nature of unlicensed band, it is expected that each device using the unlicensed band should apply a type of polite access mechanism not to monopolize the medium and not to interfere on-going transmission. As a basic rule of coexistence between LTE-U devices and Wi-Fi devices, it may be assumed that on-going transmission should not be interrupted or should be protected by proper carrier sensing mechanism. In other words, if the medium is detected as busy, the potential transmitter should wait until the medium becomes idle. The definition of idle may depend on the threshold of carrier sensing range.

There may be multiple ways of utilizing unlicensed carrier or frequency bands of higher frequency such as 5 GHz where frame structure and band specification are not fixed. Currently, there are four types of band utilization available as follows.

DL/UL paired spectrum with FDD
DL-only spectrum in FDD
DL-only spectrum in TDD
DL/UL TDD However, depending on the necessity of UL spectrum, it may be further considered to use UL-only spectrum in FDD and TDD, specifically for LTE-U carrier. That is, only UL carrier may be configured in the UL-only spectrum. Currently, there is no specification to support UL-only carrier from synchronization perspective where UL synchronization is mainly performed through synchronization based on downlink reference signal (RS) such as cell-specific RS (CRS)/PSS/SSS.

In order to solve the problem described above, a method for performing synchronization for a carrier without a synchronization signal according to an embodiment of the present invention is proposed. According to an embodiment of the present invention, there may be multiple approaches for performing UL synchronization in order to address UL-only carrier as follows.

(1) One simple approach is to allow pairing between one DL carrier and multiple UL carriers. Each UL carrier may perform synchronization with the paired one DL carrier. In this approach, the paired spectrum of DL/UL carrier may be configured as one FDD carrier. Enabling all or subset of paired UL carrier(s) may be configured independently either via media access control (MAC) control element (CE), dynamic DCI, or higher layer configuration.

(2) Another approach is to configure UL-only carrier as a single carrier. In this case, separate configuration of reference carrier for the synchronization may be considered. Notably, one DL carrier may be mapped to multiple UL carrier(s).

(3) Another approach is to consider transmission of necessary synchronization signals in UL-only carrier as well. For example, discovery RS (DRS) may be transmitted by the eNB periodically, even though the carrier is defined as a UL-only carrier. In other words, even though there will be no DL transmission in the UL-only carrier, a UE may assume necessary RS transmission in the UL-only carrier from the network. To support this, a UE needs to be able to switch DL/UL in the same frequency. Whether the DRS is transmitted by the network or not in the UL-only carrier may be indicated by higher layer.

(4) Another approach is not to perform frequency tracking. UL timing may be aligned with a synchronized UL carrier. For frequency tracking, the UE may utilize internal frequency tracking without relying on external signals from the network. For the timing, subframe boundary of UL transmission and timing from a synchronization UL carrier (e.g. licensed UL carrier) may be used. The reference carrier for timing may also be configured by higher layer.

Regardless of which option described above is used for UL synchronization, timing advance (TA) may be configured independently. Or, same cells with UL synchronization reference may be assumed to belong to a same timing advance group (TAG).

Further, a reference carrier for pathloss measurement may be independently configured from a reference carrier for synchronization. Or, reference signal received power (RSRP) measurement of UL synchronization reference carrier may be used for the serving cell for, e.g. pathloss calculation of the serving carrier.

The proposed techniques described above may be applied to a carrier (licensed or unlicensed) which may not have a paired DL spectrum or may not transmit synchronization signals.

Furthermore, a UE may be configured with multiple groups where synchronization may be shared among carriers in the same group. For example, if a UE is configured with CC1 and CC2 as a same synchronization group, synchronization signals either from CC1 or CC2 may be used for synchronization for the other. More specifically, for example, both CC1 and CC2 may be unlicensed carrier where synchronization signals are occasionally transmitted from CC1 or CC2 depending on listen-before-talk (LBT) results. Synchronization signals from either carrier may be used for both carriers' time/frequency tracking. That is, from a UE perspective, carriers configured in the same group may be treated as one carrier from the synchronization perspective. Further, RSRP measurement of the carriers in a group may be used for any carrier in the same group for, e.g. pathloss calculation of the serving carrier. Further, a reference carrier in a group may be configured by higher layer or prefixed (e.g. the lowest index cell becomes the reference).

FIG. 6 shows a method for performing an UL synchronization according to an embodiment of the present invention. The techniques described above may be applied to this embodiment.

In step S100, the UE configures at least one UL carrier in an UL-only spectrum. The at least one UL carrier may correspond to a licensed carrier or an unlicensed carrier.

In step S110, the UE performs UL synchronization on the at least one UL carrier. The UL synchronization may be performed based on one paired DL carrier. In this case, a configuration of pairing between the at least one UL carrier and the DL carrier may be received from a network, via one of MAC CE, DCI or higher layer. Alternatively, the UL synchronization may be performed based on a reference carrier for the UL synchronization. In this case, a configuration of the reference carrier may be received from a network. Alternatively, the UL synchronization may be performed based on a synchronization signal received from a network in the at least one UL carrier. In this case, whether or not the synchronization signal is received from the network in the at least one UL carrier may be indicated by a higher layer. Alternatively, the UL synchronization may be performed based on a synchronized UL carrier.

FIG. 7 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method performed by a user equipment (UE) in a wireless communication system, the method comprising:
    configuring a first time division duplex (TDD) uplink (UL) carrier in a first unlicensed band;
    configuring a second TDD UL carrier in a second unlicensed band;
    detecting that the first TDD UL carrier and the second TDD UL carrier do not transmit a synchronization signal;
    pairing the first TDD UL carrier with a frequency division duplex (FDD) downlink (DL) carrier in a third unlicensed band;
    pairing the second TDD UL carrier with the FDD DL carrier in the third unlicensed band; and
    performing UL synchronization of the first TDD UL carrier with the FDD DL carrier and UL synchronization of the second TDD UL carrier with the FDD DL carrier,
    wherein the paired first TDD UL carrier and the FDD DL carrier is configured as one FDD carrier,
    wherein the paired second TDD UL carrier and the FDD DL carrier is configured as one FDD carrier, and
    wherein a subset of the paired first TDD UL carrier and the second TDD UL carrier is enabled independently via a medium access control (MAC) control element (CE).

2. A user equipment (UE) comprising:
    a memory;
    a transceiver; and
    a processor, coupled to the memory and the transceiver, and configured to:
    configure a first time division duplex (TDD) uplink (UL) carrier in a first unlicensed band;
    configure a second TDD UL carrier in a second unlicensed band;
    detect that the first TDD UL carrier and the second TDD UL carrier do not transmit a synchronization signal;
    pair the first TDD UL carrier with a frequency division duplex (FDD) downlink (DL) carrier in a third unlicensed band;
    pair the second TDD UL carrier with the FDD DL carrier in the third unlicensed band, and
    perform UL synchronization of the first TDD UL carrier with the FDD DL carrier and UL synchronization of the second TDD UL carrier with the FDD DL carrier,
    wherein the paired first TDD UL carrier and the FDD DL carrier is configured as one FDD carrier,
    wherein the paired second TDD UL carrier and the FDD DL carrier is configured as one FDD carrier, and
    wherein a subset of the paired first TDD UL carrier and the second TDD UL carrier is enabled independently via a medium access control (MAC) control element (CE).

* * * * *